US012340752B2

(12) United States Patent
Jung et al.

(10) Patent No.: US 12,340,752 B2
(45) Date of Patent: Jun. 24, 2025

(54) DISPLAY DEVICE AND DRIVING METHOD THEREOF

(71) Applicant: LG DISPLAY CO., LTD., Seoul (KR)

(72) Inventors: Heain Jung, Gyeonggi-do (KR); Myungkook Moon, Gyeonggi-do (KR)

(73) Assignee: LG Display Co., Ltd. (KR)

( * ) Notice: Subject to any disclaimer, the term of this patent is extended or adjusted under 35 U.S.C. 154(b) by 0 days.

(21) Appl. No.: 18/381,820

(22) Filed: Oct. 19, 2023

(65) Prior Publication Data

US 2024/0221672 A1 Jul. 4, 2024

(30) Foreign Application Priority Data

Dec. 28, 2022 (KR) ........................ 10-2022-0187618

(51) Int. Cl.
*G09G 3/3258* (2016.01)

(52) U.S. Cl.
CPC ....... *G09G 3/3258* (2013.01); *G09G 2310/08* (2013.01); *G09G 2320/0233* (2013.01); *G09G 2330/021* (2013.01)

(58) Field of Classification Search
CPC ............... G09G 3/3275; G09G 3/3258; G09G 2310/08; G09G 3/3233; G09G 2330/021; G09G 2320/0233; G09G 2360/16
See application file for complete search history.

(56) References Cited

U.S. PATENT DOCUMENTS

2008/0246701 A1* 10/2008 Park ..................... G09G 3/3233 345/77
2022/0011895 A1* 1/2022 Park ..................... G06F 3/04184
2023/0034225 A1* 2/2023 Tanaka ................. G09G 3/3241

FOREIGN PATENT DOCUMENTS

KR 10-2022-0019040 A 2/2022

* cited by examiner

*Primary Examiner* — Muhammad N Edun
(74) *Attorney, Agent, or Firm* — Fish & Richardson P.C.

(57) ABSTRACT

A display device includes a display panel comprising a plurality of pixels displaying an image; a data driver configured to supply a data signal to the plurality of pixels and comprising a plurality of source drive integrated circuits (ICs); and a timing controller configured to differentially supply video data to the data driver by a frame based on a gradation difference in the video data among consecutive pixel rows.

19 Claims, 9 Drawing Sheets

DISPLAY DEVICE AND DRIVING METHOD THEREOF

CROSS-REFERENCE TO RELATED APPLICATION

The present application claims priority to Korean Patent Application No. 10-2022-0187618, filed on Dec. 28, 2022, which is hereby incorporated by reference in its entirety.

BACKGROUND

Field of the Disclosure

The present disclosure relates to a display device and a driving method thereof.

Description of the Background

There are various display devices such as liquid crystal display (LCD) devices, electroluminescence (EL) display devices, field emission display (FED) devices, and quantum dot (QD) display devices. Electroluminescence display devices may be classified into inorganic electroluminescence display devices and organic electroluminescence display devices, depending on the material of the luminescent layer.

To reduce power consumption in such display devices, low-power transmission driving (LPTD) has been developed as a solution. When Low Power Tx Driving is activated, the source drive circuit stores the video data in memory if two or more pixel rows in the area handled by the source drive circuit display the same image. The source drive circuit may periodically read the video data stored in the frame buffer and transmit it to the display panel. While the same image is continuously displayed on pixel rows, the video data is not transmitted from the timing controller to the source drive circuit. Consequently, Low Power Tx Driving allows for power consumption reduction in the timing controller.

SUMMARY

Accordingly, the present disclosure is directed to a display device and a driving method thereof that substantially obviate one or more of problems due to limitations and disadvantages described above.

Additional features and advantages of the disclosure will be set forth in the description which follows and in part will be apparent from the description, or may be learned by practice of the disclosure. Other advantages of the present disclosure will be realized and attained by the structure particularly pointed out in the written description and claims hereof as well as the appended drawings.

More specifically, the present disclosure is to provide display devices and driving methods thereof that are capable of reducing power consumption.

The present disclosure is also to provide display devices and driving methods thereof that are capable of setting different threshold ranges to determine low-power transmission driving based on the luminance of the image.

Further, the present disclosure is to provide display devices and driving methods thereof that are capable of restricting low-power transmission driving for low-luminance images in display panels employing external compensation.

To achieve these and other advantages and in accordance with the present disclosure, as embodied and broadly described, a display device includes a display panel including a plurality of pixels arranged thereon for displaying an image, a data driver configured to supply a data signal to the plurality of pixels and comprising a plurality of source drive circuits, and a timing controller configured to supply video data to the data driver in units of frames.

The display device operates, in response to a gradation difference of the video data between consecutive pixel rows being equal to or less than a threshold value, in a low-power transmission driving mode suspending transmission of the video data corresponding to the consecutive pixel rows for at least one corresponding source drive circuit among the corresponding source drive circuits and, in response to the gradation difference of the video data between the consecutive pixel rows being greater than the threshold value, in a normal transmission driving mode transmitting the video data corresponding to the consecutive pixel rows for at least one corresponding source drive circuit among the source drive circuits.

The threshold value may vary depending on the luminance of the corresponding frame.

The threshold value may increase as the luminance of the corresponding frame increases.

The timing controller may determine the average luminance of the video data and adjust the threshold value to correspond to the average luminance.

The timing controller may operate, based on the consecutive pixel rows varying identically in gradation, in the low-power transmission driving mode for an image area of a first luminance and in the normal transmission driving mode for an image area of a second luminance lower than the first luminance.

The timing controller may divide the display panel into a plurality of areas and adjust the threshold value independently based on the luminance of each of the plurality of areas.

The timing controller may control the low-power transmission driving mode independently for the plurality of source drive circuits.

The timing controller may receive sensing data for the plurality of pixels from the plurality of source drive circuits and compensate the video data based on the sensing data.

The timing controller may transmit the compensated video data to the plurality of source drive circuits in the normal transmission driving mode and suspend the transmission of the compensated video data in the low-power transmission driving mode.

The timing controller may transmit, based on the consecutive pixel rows varying identically in gradation, the compensated video data according to an increased threshold value for an image area of a first luminance and suspend transmitting the compensated video data according to a decreased threshold value for an image area of a second luminance higher than the first luminance.

The threshold value may be stored in the form of a lookup table corresponding to each of a plurality of luminance ranges.

In another aspect of the present disclosure, a method for driving a display device includes a display panel including a plurality of pixels arranged thereon to display an image, a plurality of source drive circuits supplying a data signal to the plurality of pixels, and a timing controller transmitting video data to the plurality of source drive circuits in units of frame includes determining, by the timing controller, a luminance of the video data received from an external source, adjusting a threshold value to correspond to the luminance of the corresponding frame, operating, in response to a gradation difference of the video data between consecutive pixel rows being equal to or less than the threshold value, in a low-power transmission driving mode suspending transmission of the video data corresponding to the consecutive pixel rows for at least one corresponding source drive circuit among the corresponding source drive circuits, and operating, in response to the gradation difference of the video data between the consecutive pixel rows being greater than the threshold value, in a normal transmission driving mode transmitting the video data corresponding to the consecutive pixel rows for at least one corresponding source drive circuit among the source drive circuits.

The threshold value may increase as the luminance of the corresponding frame increases.

The determining of the luminance of the video data may include dividing the display panel into a plurality of areas in units of pixel row and determining the luminance for each of the plurality of areas.

The determining of the luminance of the video data may include determining the luminance for each of the plurality of areas connected, respectively, to the plurality of source drive circuits.

The adjusting of the threshold value may adjust the threshold value independently for each of the plurality of areas.

The method may further include receiving sensing data for the plurality of pixels from the source drive circuits; and compensating the video data based on the sensing data.

The method may further include transmitting the compensated video data for a first pixel row among two or more pixel rows and suspending the transmission of the compensated video data for remaining pixel rows starting from a second pixel row among the two or more pixel rows.

In a further aspect of the present disclosure, a display device includes a display panel comprising a plurality of pixels displaying an image; a data driver configured to supply a data signal to the plurality of pixels and comprising a plurality of source drive integrated circuits (ICs); and a timing controller configured to differentially supply video data to the data driver by a frame based on a gradation difference in the video data among consecutive pixel rows.

It is to be understood that both the foregoing general description and the following detailed description are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of the disclosure, illustrate aspects of the disclosure and together with the description serve to explain the principle of the disclosure.

In the drawings.

DETAILED DESCRIPTION

Figure 1:
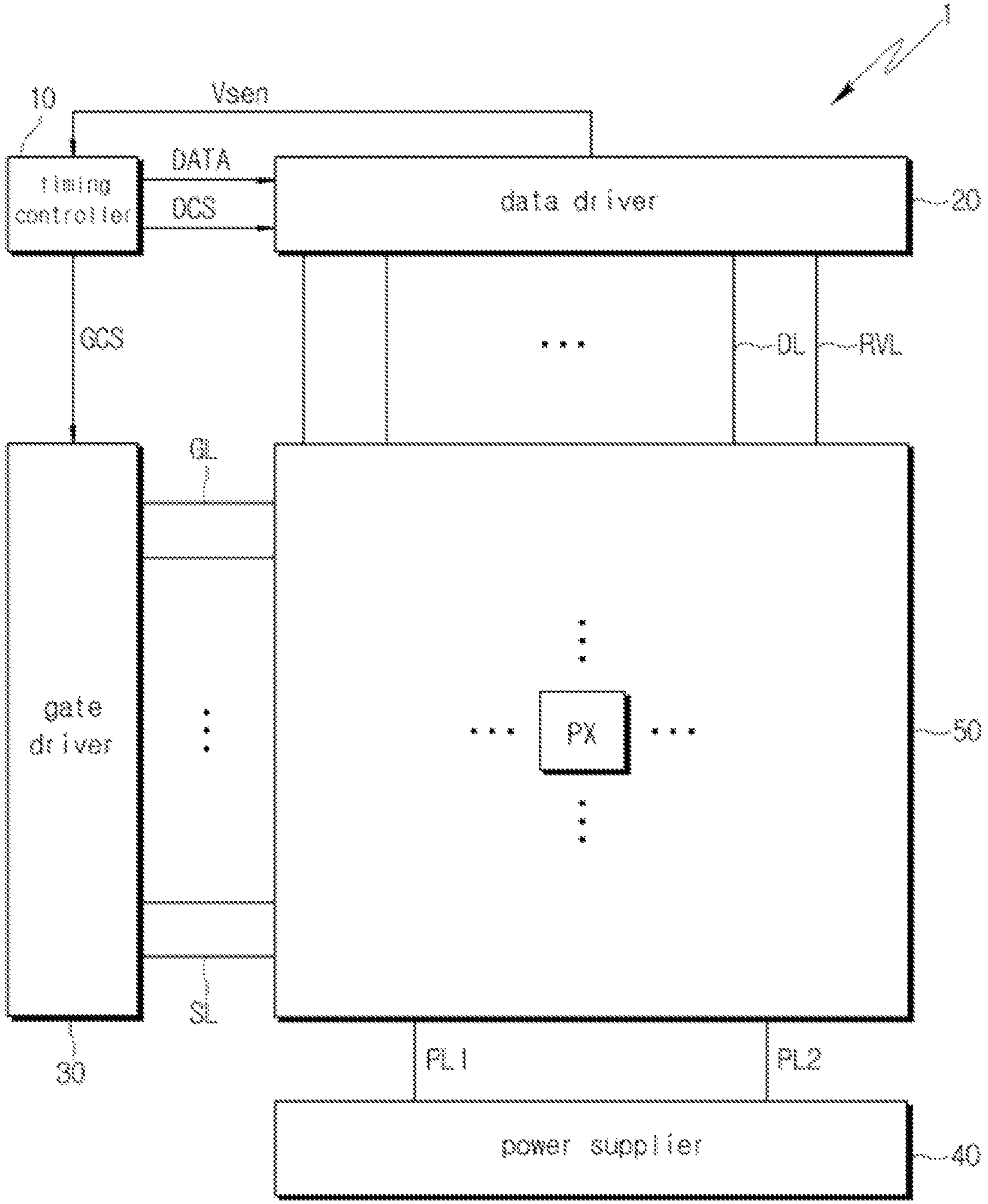
FIG. 1 is a block diagram illustrating a display device according to an aspect of the present disclosure.

Hereinafter, aspects will be described with reference to accompanying drawings. In the specification, when a component (or area, layer, part, etc.) is mentioned as being "on top of," "connected to," or "coupled to" another component, it means that it may be directly connected/coupled to the other component, or a third component may be placed between them.

The same reference numerals refer to the same components. In addition, in the drawings, the thickness, proportions, and dimensions of the components are exaggerated for effective description of the technical content. The expression "and/or" is taken to include one or more combinations that may be defined by associated components.

The terms "first," "second," etc. are used to describe various components, but the components should not be limited by these terms. The terms are used only for distinguishing one component from another component. For example, a first component may be referred to as a second component and, similarly, the second component may be referred to as the first component, without departing from the scope of the present disclosure. As used herein, the singular forms are intended to include the plural forms as well, unless the context clearly indicates otherwise.

The terms such as "below," "lower," "above," "upper," etc. are used to describe the relationship of components depicted in the drawings. The terms are relative concepts and are described based on the direction indicated on the drawing.

It will be further understood that the terms "comprises," "has," and the like are intended to specify the presence of stated features, numbers, steps, operations, components, parts, or a combination thereof but are not intended to preclude the presence or possibility of one or more other features, numbers, steps, operations, components, parts, or combinations thereof.

FIG. 1 is a block diagram illustrating a display device according to an aspect of the present disclosure.

With reference to FIG. 1, the display device 1 includes a timing controller 10, a data driver 20, a gate driver 30, a power supplier 40, and a display panel 50.

The timing controller 10 receives timing signals and video data from an external system (e.g., a host) and generates data control signals DCS and gate control signals GCS. The timing signals may include a data enable signal, a horizontal sync signal, a vertical sync signal, and the main clock.

The gate control signals GCS may include scan timing control signals such as gate start pulse, gate shift clock, and gate output enable signal. The data control signals DCS may include data timing control signals such as source sampling clock, polarity control signal, and source output enable signal.

The timing controller 10 may be placed on a control printed circuit board connected to the source printed circuit board, on which the data driver 20 is bonded, through a connection medium such as flexible flat cable (FFC) and flexible printed circuit (FPC). For example, the timing controller 10 may be connected to the data driver 20 through embedded clock point-to-point interface (EPI) wire pairs to transmit and receive data.

The data driver 20 may convert the digital video data (DATA) received from the timing controller 10 into analog data signals according to the data control signal DCS. The data driver 20 may apply the analog data signals to corresponding pixels PX through the data lines DL.

In an aspect of the present disclosure, the data driver 20 may also be further connected to the pixels PX via the readout lines RVL. The data driver 20 may provide a reference voltage to the pixels PX or sense the state of the pixels PX based on the feedback electrical signals from the pixels PX through the readout lines RVL. In this aspect, the timing controller 10 may generate compensated video data by compensating the video data based on the sensing data Vsen acquired through the data driver 20. The compensation of the video data may involve compensating for one or more of the threshold voltage and mobility of the driving transistors and/or operating point voltage of the organic light-emitting diodes for the pixels PX. By supplying the compensated video data to the data driver 20, image quality degradation such as mura on the display panel 50 may be improved.

The data driver 20 may be implemented as a source drive circuit or a source drive integrated circuit (IC). The data driver 20 may be connected to the bonding pads of the display panel 50 using tape automated bonding (TAB) or chip on glass (COG) methods, or directly arranged on the display panel 50, and in some cases, it may be integrated and arranged within the display panel 50.

The gate driver 30, in response to the gate control signals GCS received from the timing controller 10, may sequentially output gate signal through the gate lines GL by a horizontal period within a frame. Accordingly, the pixel rows connected to each gate line GL may be turned on in one horizontal period. During one horizontal period, data signals may be applied to the turned-on pixel rows through the data lines DL.

In an aspect of the present disclosure, the gate driver 30 may be further connected to the pixels PX via the sensing lines SL. The gate driver 30 may apply sensing signals to the pixels PX through the sensing lines SL during a sensing period to sense the pixels PX.

The gate driver 30 may comprise a plurality of stage circuits connected to a plurality of gate lines GL and may be implemented in a gate in panel (GIP) form integrated on the display panel 50, as illustrated. The gate driver 30 may include shift registers, level shifters, or the like.

The power supplier 40 may convert the externally input voltage into predetermined high-potential voltages ELVDD and low-potential voltage ELVSS used internally as standard voltage in the display device 1 and output them to the components through power lines PL1 and PL2. The power supplier 40 may be arranged on the control printed circuit board where the timing controller 10 is positioned. Such a power supplier 40 may be referred to as a power management IC (PMIC).

The display panel 50 includes a plurality of pixels PX (or sub-pixels) arranged thereon. The pixels PX may be arranged in a matrix form on the display panel, for example. The pixels PX arranged in one pixel row are connected to the same gate line GL, and the pixels PX arranged in one pixel column are connected to the same data line DL. The pixels PX may emit light corresponding to the data signal supplied through the data lines DL.

In an aspect of the present disclosure, each pixel PX may display one of the colors, red, green, or blue. In another aspect of the present disclosure, each pixel PX may display one of the colors, cyan, magenta, or yellow. In various aspects, each pixel PX may display one of the colors, red, green, blue, or white.

The timing controller 10, data driver 20, gate driver 30, and power supplier 40 may be configured as separate discrete integrated circuits (ICs), or some of them may be integrated into a single IC.

In an aspect of the present disclosure, a display device includes a display panel comprising a plurality of pixels displaying an image; a data driver configured to supply a data signal to the plurality of pixels and comprising a plurality of source drive integrated circuits (ICs); and a timing controller configured to differentially supply video data to the data driver by a frame based on a gradation difference in the video data among consecutive pixel rows.

More specifically, the display device 1 may be configured to operate in a low-power transmission driving mode. The timing controller 10 may detect whether a set of predetermined pixel rows in the display panel 50 display the same pattern (same image) or a similar pattern based on the input video data received from an external host. If the predetermined pixel rows display the same or similar gradation, the timing controller 10 may reduce power consumption by transmitting the video data DATA to the data driver 20 corresponding to the first pixel row and then suspending the transmission of the video data DATA to the data driver 20 during the corresponding period of the remaining pixel rows. In one aspect, the timing controller 10 may further reduce power consumption by deactivating the digital circuitry of the data driver 20 where the transmission of video data DATA is suspended.

Hereinafter, a description is made of the low-power transmission driving in detail.

Figure 2:
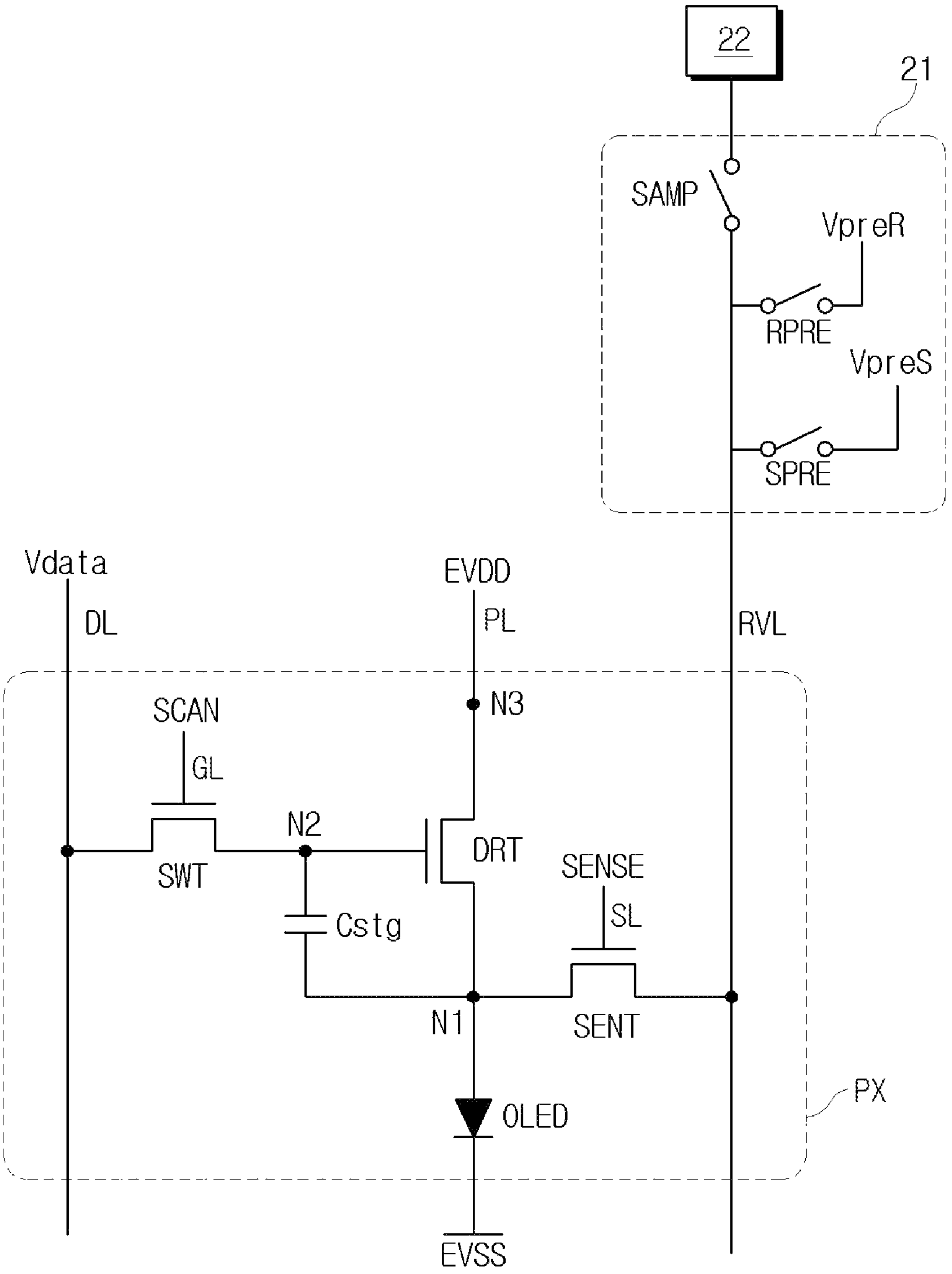
FIG. 2 is a circuit diagram illustrating a pixel according to an aspect of the present disclosure.

FIG. 2 is a circuit diagram illustrating a pixel according to an aspect. In FIG. 2, a sample and hold circuit 21 connected to the readout line RVL of the pixel PX is depicted together.

The pixel PX may include circuit components for driving an organic light-emitting diode OLED and controlling the organic light-emitting diode OLED. The circuit components may include, for example, a driving transistor DRT, a sensing transistor SENT electrically connected between the first node N1 of the driving transistor DRT and the readout line RVL, and a switching transistor SWT electrically connected between the second node N2 of the driving transistor DRT and the data line DL for supplying data voltage Vdata. The circuit components may also include a storage capacitor Cstg electrically connected between the first node N1 and the second node N2 of the driving transistor DRT.

The organic light-emitting diode OLED may include a first electrode (e.g., an anode electrode or a cathode electrode), an organic layer, and a second electrode (e.g., a cathode electrode or an anode electrode).

The driving transistor DRT drives the organic light-emitting diode OLED to emit light by supplying driving current to the organic light-emitting diode OLED. The first node N1 of the driving transistor DRT may be electrically connected to the first electrode of the organic light-emitting diode OLED and may be the source node or the drain node. The second node N2 of the driving transistor DRT is electrically connected to the source node or the drain node of the switching transistor SWT and may be the gate node. The third node N3 of the driving transistor DRT is electrically connected to the power line PL supplying a driving voltage EVLDD and may be the drain node or the source node.

The sensing transistor SENT, turned on by a sensing signal SENSE, applies a reference voltage VpreR or VpreS to the first node N1 of the driving transistor DRT. When turned on, the sensing transistor SENT may provide a sensing path for the first node N1 of the driving transistor DRT.

The switching transistor SWT, when turned on by a gate signal SCAN, may transmit the data voltage Vdata supplied through the data line DL to the second node N2 of the driving transistor DRT. The sensing transistor SENT and the switching transistor SWT may be separately controlled to be turned on or off when connected to different gate lines GL or collectively controlled when connected to the same gate line GL.

The storage capacitor Cstg, electrically connected between the first node N1 and the second node N2 of the driving transistor DRT, may maintain the data voltage Vdata corresponding to the video signal voltage or a corresponding voltage for one frame duration.

As the pixel PX is driven for longer periods, degradation may occur in circuit components such as the organic light-emitting diode OLED and the driving transistor DRT. As a result, the circuit components such as the organic light-emitting diode OLED and the driving transistor DRT may undergo changes in their inherent characteristics. The changes in the characteristics of these circuit components may result in variations in the luminance of the corresponding pixel PX, and the differences in characteristic changes among the circuit components, resulting from varying degrees of degradation, may lead to variations in luminance among pixels PX.

In this regard, the pixel PX may incorporate a sensing function to detect the changes in characteristics within the pixel PX or the variations in characteristics among pixels PX. To implement this functionality, a sample and hold circuit 21 may be connected to the readout line RVL.

The sample and hold circuit 21 may include a driving reference voltage switch RPRE for controlling the supply of a driving reference voltage VpreR to the readout line RVL and a sensing reference voltage switch SPRE for controlling the supply of a sensing reference voltage VpreS to the readout line RVL.

The driving reference voltage switch RPRE ensures that the driving reference voltage VpreR is supplied to the first node N1 of the driving transistor DRT when the sensing transistor SENT is turned on by a gate signal.

The sensing reference voltage switch SPRE controls the supply of the sensing reference voltage VpreS to the readout line RVL, while the sampling switch SAMP controls the connection between the readout line RVL and the sensing unit 22 to sense the voltage for sensing the characteristics of the pixel PX.

When the sensing reference voltage switch SPRE is turned on, the sensing reference voltage VpreS is supplied to the readout line RVL. The sensing reference voltage VpreS supplied to the readout line RVL may be applied to the first node N1 of the driving transistor DRT through the turned-on sensing transistor SENT.

When the voltage at the first node N1 of the driving transistor DRT reflects the characteristics of the pixel PX, the voltage on the readout line RVL, which is equipotential to the first node N1 of the driving transistor DRT, may also reflect the characteristics of the pixel PX. Consequently, the voltage reflecting the characteristics of the pixel PX may be charged to the line capacitor formed on the readout line RVL. That is, when the sensing transistor SENT is turned on, the voltage on the readout line RVL and the voltage charged to the line capacitor formed on the readout line RVL may be the same.

When the voltage at the first node N1 of the driving transistor DRT represents the characteristics of the pixel PX, the sampling switch SAMP may be turned on, allowing the connection between the sensing unit 22 and the readout line RVL. Consequently, the sensing unit 22 senses the voltage on the readout line RVL, which reflects the characteristics of the pixel PX.

The sample and hold circuit 21 may include the sampling switch SAMP that samples the voltage on the readout line RVL to sense the characteristics of the circuit components within the pixel PX connected to the readout line RVL. The sampling switch SAMP controls the connection between the readout line RVL and the sensing unit 22 for sensing the characteristics of the pixel PX.

In various aspects, the sensing unit 22 may be implemented within the data driver 20. The data driver 20 may generate electrical information about the characteristics of the pixel PX obtained via the sensing unit 22 as sensing data Vsen and transmit the sensing data Vsen to the timing controller 10. This compensation method may be referred to as an external compensation method.

Figure 3:
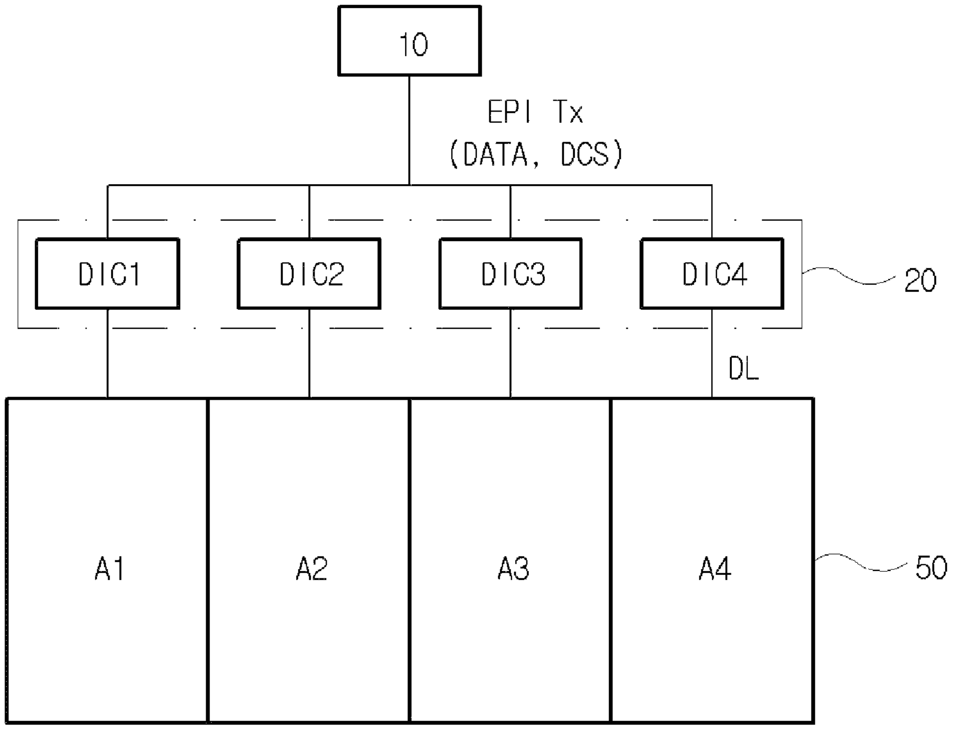
FIG. 3 is a diagram illustrating an exemplary implementation of a display device according to an aspect of the present disclosure.
Figure 4:
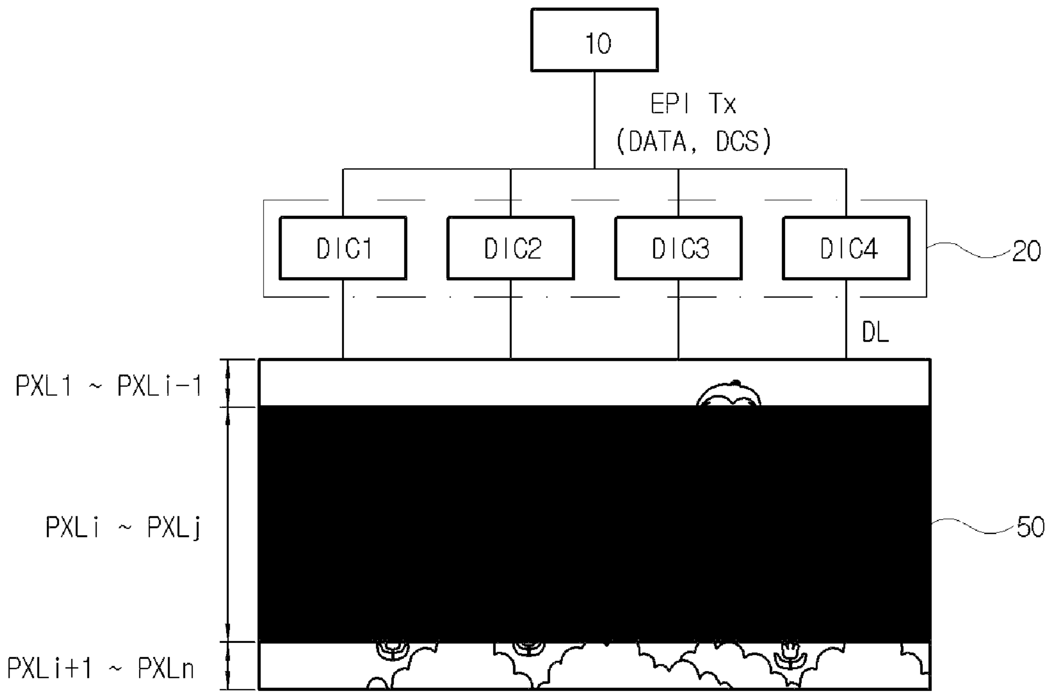
FIG. 4 is a diagram illustrating an exemplary display of an image on a display panel according to an aspect of the present disclosure.

FIG. 3 is a diagram illustrating an exemplary implementation of a display device according to one aspect. FIG. 4 is a diagram illustrating an exemplary display of an image on a display panel according to an aspect of the present disclosure.

With reference to FIG. 3, the data driver 20 may include one or more source drive circuits DIC1 to DIC4. The timing controller 10 may be separately connected to the respective source drive circuits DIC1 to DIC4 via dedicated lines. Although the data driver 20 includes four source drive circuits (DIC1 to DIC4) in the drawing, this aspect is not limited thereto.

The source drive circuits DIC1 to DIC4 may each include a register, a latch, a digital-to-analog converter, and an output buffer. Each source driving circuit receives the data control signal (DCS in FIG. 1) from the timing controller 10 and generates a data signal based on the data control signal. The source drive circuits DIC1 to DIC4 are connected to the corresponding data lines (DL in FIG. 1) and may supply data signals. The number of source drive circuits DIC1 to DIC4 may vary depending on factors such as the size and resolution of the display panel 50.

Each of the source drive circuits DIC1 to DIC4 may be connected to the display panel 50 using a tape automated bonding (TAB) method, chip-on-glass (COG) or chip-on-panel (COP) method via a bonding pad, or implemented using a chip-on-film (COF) method and connected to the display panel 50. In this case, each of the source drive circuits DIC1 to DIC4 may be mounted on a circuit film connected to the display panel 50.

The display panel 50 may include a plurality of display areas A1 to A4 to which the corresponding source drive circuits DIC1 to DIC4 are connected, respectively. The display areas A1 to A4 may output images based on the data signals received from their respective source drive circuits DIC1 to DIC4.

In an aspect, the display device 1 may operate in a low-power transmission driving mode. For example, with reference to FIG. 4, among the plurality of pixel rows PXL1 to PXLn (where n is a natural number) arranged on the display panel 50, two or more consecutive pixel rows PXLi to PXLj (where i and j are arbitrary natural numbers smaller than n) may display the same gradation. In this aspect, the timing controller 10 transfers the video data DATA of the i-th pixel row PXLi to the source drive circuits DIC1 to DIC4 during the i-th horizontal period within one frame. In this case, during the horizontal periods in which the video data DATA of the remaining pixel rows PXLi+1 to PXLj displaying the same gradation are supposed to be transferred, the timing controller 10 operates in a low-power mode (EPI Tx Off) by suspending the transmission of video data DATA to the source drive circuits DIC1 to DIC4.

During the suspension of transmission, the source drive circuits DIC1 to DIC4 may store the video data DATA of the $i^{th}$ pixel row PXLi in their built-in memory or channel input buffer and repeatedly output the stored video data DATA to the remaining pixel rows PXLi+1 to PXLj.

Afterward, when video data DATA with a different gradation for the two or more pixel rows PXLi to PXLj is input from the host, the timing controller 10 may output a clock training pattern, during the horizontal period in which the video data DATA of the last pixel row PXLj of the two or more pixel rows PXLi to PXLj needs to be transmitted, to wake up the source drive circuits DIC1 to DIC4. Accordingly, the source drive circuits DIC1 to DIC4 may correctly receive the video data DATA at the timing when the video data DATA of the $(j+1)^{th}$ pixel row PXLj+1 is being transmitted (EPI Tx On).

When the display device 1 operates in a low-power transmission mode as described above, the video data DATA for the two or more pixel rows PXLi to PXLj is not transmitted from the timing controller 10 to the data driver 20, while the video data DATA for those pixel rows PXLi to PXLj remains fixed at the same value. When applying the external compensation method described with reference to FIG. 2, the degree of degradation may vary for each pixel row PXLi to PXLj, and thus different compensation values may need to be applied to each pixel row PXLi to PXLj. However, during the low-power transmission mode, the compensated video data DATA for those pixel rows PXLi to PXLj cannot be transmitted from the timing controller 10 to the data driver 20, resulting in the display panel 50 being unable to compensate for quality degradation such as mura (unevenness) during this mode.

Alternatively, when the compensated video data DATA for those pixel rows PXLi to PXLj has different values based on sensing results, the timing controller 10 may choose not to operate in the low-power transmission driving mode relying on the compensated video data DATA. That is, when the compensated video data DATA for pixel rows PXLi to PXLj, which are displaying the same gradation, has different values, the timing controller 10 may choose not to perform low-power transmission driving mode and instead transmit the compensated video data DATA to the data driver 20, consuming power in the process.

Figure 5:
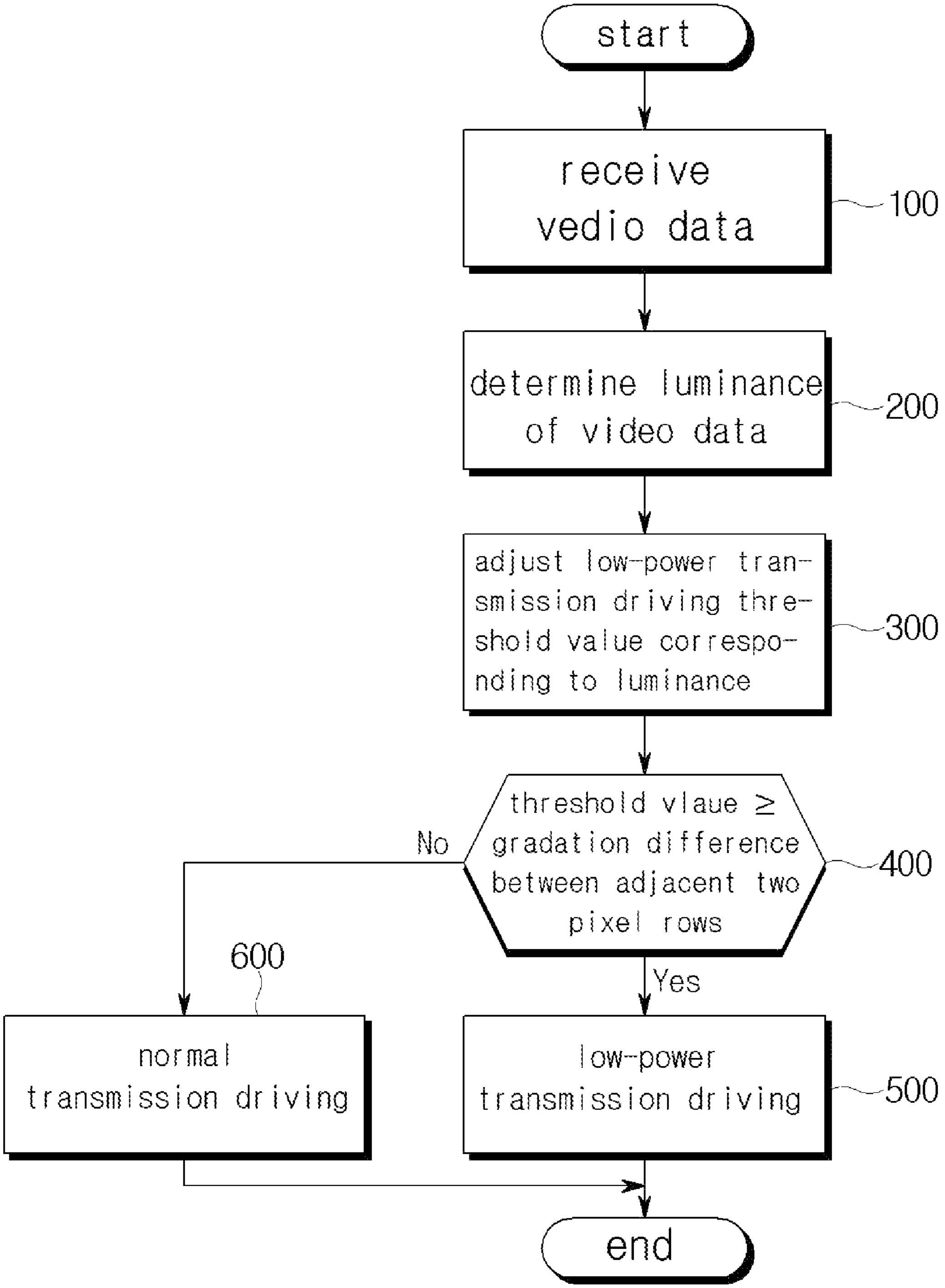
FIG. 5 is a flowchart illustrating a driving method of a display device according to an aspect of the present disclosure.

FIG. 5 is a flowchart illustrating a driving method of a display device according to an aspect. The following operations may be performed by the timing controller 10, but are not limited thereto. That is, at least some or all of the operations described below may be performed by other components (such as the data driver 20) having similar or complementary functions to the timing controller 10 or configured to assist the timing controller 10.

With reference to FIG. 5, the display device 1 according to an aspect may receive video data DATA from an external system at step 100. This video data may include the R, G, B values of the image to be displayed on each pixel PX of the display panel 50.

The display device 1 may determine the luminance (brightness) of the image based on the received video data at step 200. The display device 1 may analyze the red (R), green (G), and blue (B) values of the input video data DATA to determine the luminance of the corresponding frame to be displayed on the display panel 50.

In an exemplary aspect, the display device 1 may determine the average luminance of the video data to be displayed over the entire area of the display panel 50. In another aspect, the display device 1 may divide the display panel 50 into a plurality of areas and determine the average luminance of the video data to be displayed in each area. In this case, the display device 1 may divide the display panel 50 into two or more pixel row units or into areas associated with each source drive circuit DIC. The display device 1 may determine the average luminance for each divided area.

The display device 1 may adjust the low-power transmission driving threshold value (hereinafter referred to as threshold value) based on the determined luminance of the video data at step 300. Here, the threshold value is defined as the maximum difference in gradation between adjacent two pixel rows, which is used to determine whether to enter the low-power transmission driving mode, and may represent a gradation difference range to determine whether adjacent two pixel rows are displaying practically the same image.

The threshold value may be preset to correspond to the luminance of the image data. For example, the threshold value may be preset as a lookup table that defines values corresponding to a plurality of luminance ranges, respectively. In an aspect, the display device 1 may load a predetermined threshold value corresponding to the luminance of the determined video data DATA from the lookup table. However, this aspect is not limited thereto.

When the display device 1 determines the luminance for each area of the display panel 50, the threshold values may be adjusted independently for each area. Similarly, when the display device 1 determines the luminance for each area associated with each source drive circuit DIC, the threshold value may be adjusted independently for each source drive circuit DIC.

In an aspect, the threshold value may be set larger as the luminance of the image data increases, and smaller as the luminance decreases. That is, the display device 1 may increase the threshold value when the determined luminance of the image data is high, and decrease the threshold value when the luminance is low.

The threshold value is set larger to broaden the range of gradation differences that are considered to represent the same image, while it is set smaller to narrow down the range of gradation differences that are considered to represent practically the same image. Accordingly, when there is a certain gradation difference between adjacent pixel rows, setting a larger threshold value expands the range of application for low-power transmission driving, while setting a smaller threshold value restricts the application of low-power transmission driving relatively.

As described with reference to FIG. 3, when external compensation cannot be applied due to low-power transmission driving, mura may be visible on the display panel 50. On the other hand, restricting low-power transmission driving for the purpose of external compensation to improve image quality may overshadow the power-saving effect.

To address this issue, in an aspect, the condition for the display device 1 to enter the low-power transmission driving mode may be set differently based on the luminance of the video data. Mura, which occurs when external compensation cannot be applied, is generally more noticeable in low-luminance images (darker images) than in high-luminance images (brighter images). In the case of relatively high-luminance images, mura may not be easily visible to the user, whereas in the case of low-luminance images, mura may be more noticeable to the user.

In an aspect of the present disclosure, the display device 1 may widen the range of low-power transmission driving for bright images to maximize the power-saving effect, while narrowing the range of low-power transmission driving for dark images to prevent mura and improve image quality.

Afterward, the display device may control the low-power transmission driving based on the variable threshold values. In detail, when it is determined at step 400 that the gradation difference between adjacent two pixel rows is equal to or less than a variable threshold value, the display device 1 may determine at step 500 that those pixel rows are displaying the same image (having practically the same gradation) (EPI Tx Off). On the contrary, when it is determined at step 400 that the gradation difference between adjacent two pixel rows is greater than a variable threshold value, the display device 1 may determine at step 600 that those pixel rows are displaying different images (having different gradations) (EPI Tx On).

Hereinafter, a description is made of the method for driving the display device in various aspects of the present disclosure.

FIGS. 6 to 9 are diagrams for explaining the driving method of a display device according to an aspect of the present disclosure.

According to an aspect, the display device 1 may determine the luminance of the image displayed on the display panel 50 based on the input video data from an external source. In an aspect, the display device 1 may determine the average luminance for the entire area of the display panel 50.

Figure 6:
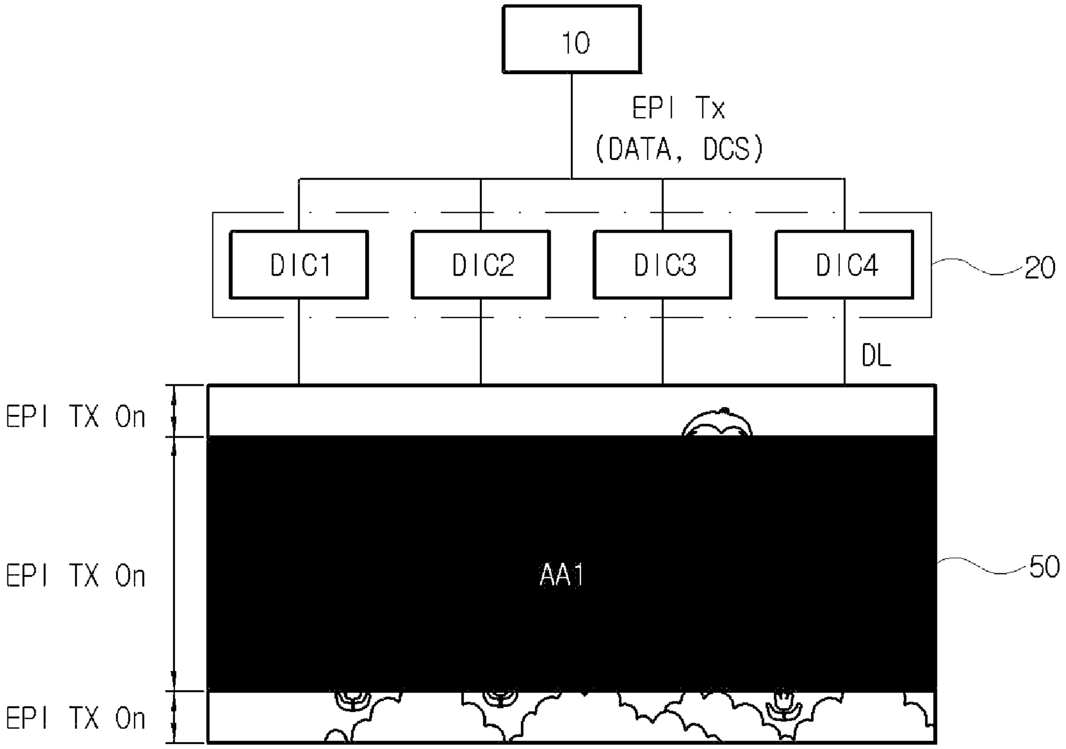
FIGS. 6 to 9 are diagrams for explaining the driving operation of a display device according to an aspect of the present disclosure.

In an aspect of the present disclosure, a low-luminance image may be displayed in a first area AA1 of the display panel 50 as shown in FIG. 6. A low-luminance image refers to frame-based video data (R, G, and B values) having a luminance below a predetermined threshold within predetermined pixels (or areas). The first area AA1 may account for more than half of the total area of the display panel 50. In this aspect, the average luminance of the entire image displayed on the display panel 50 is low. The display device 1 may decrease the threshold value for low-power transmission driving in response to low-luminance images.

In FIG. 6, even though the first area AA1 displays an image with practically small gradation differences, the display device 1 may operate in normal transmission driving mode (EPI Tx On) instead of low-power transmission driving mode due to the low threshold value. Accordingly, the video data corresponding to the first area AA1 may be transmitted from the timing controller 10 to the data driver 20.

During this process, pixel sensing may be performed for the first area AA1 via the data driver 20, and the timing controller 10 may use the sensed data Vsen obtained through the data driver 20 to compensate for the video data. The timing controller 10 may transmit the compensated video data for the first area AA1 to the data driver 20, and the display panel 50 may display a high-quality image with improved mura based on the compensated video data.

Figure 7:
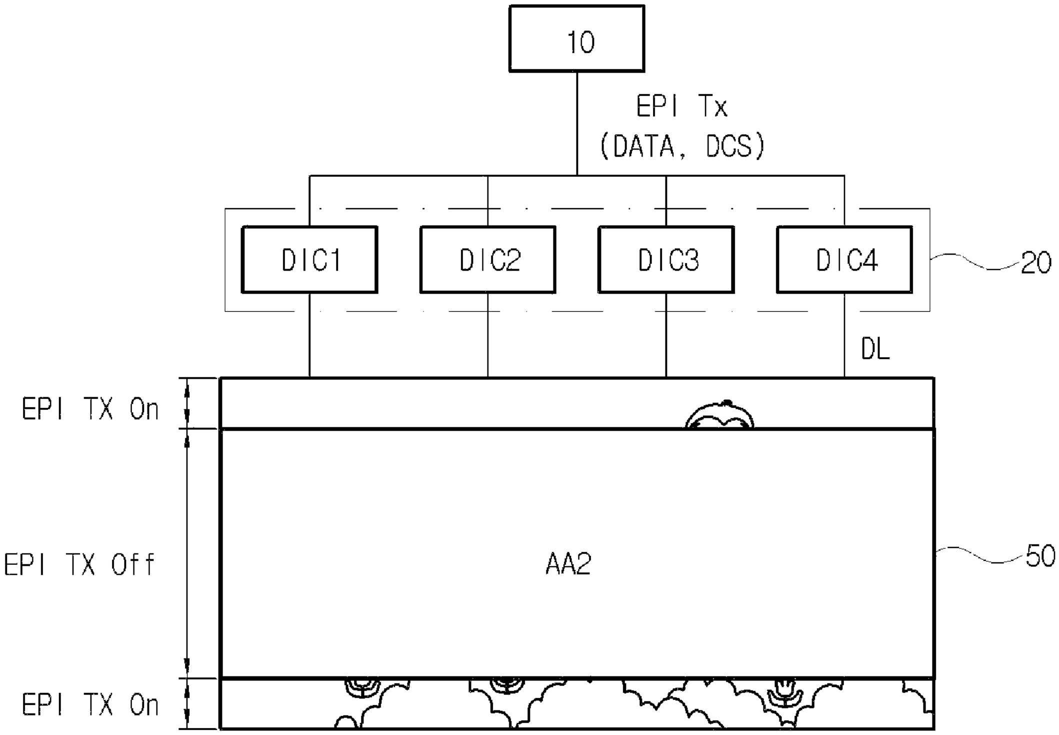

In another aspect, as shown in FIG. 7, a high-luminance image may be displayed in a second area AA2 of the display panel 50. A high-luminance image refers to frame-based video data that exhibits a luminance above a predetermined threshold within predetermined pixels or areas. The second area AA2 may cover more than half of the total area of the display panel 50. In this aspect, the average luminance of the entire image displayed on the display panel 50 is high. The display device 1 may increase the threshold for low-power transmission driving in response to high-luminance images.

Even though there is a large gradation difference between adjacent pixel rows in the second area AA2, the display device 1 may operate in low-power transmission driving mode (EPI Tx Off) due to the increased threshold. Consequently, the video data corresponding to the second area AA2 is not transmitted from the timing controller 10 to the data driver 20, and the data driver 20, instead, loads video data stored in memory or output buffers and transmits the video data to the display panel 50.

Even though pixel sensing is performed through the data driver 20, the timing controller 10 does not transmit compensated video data to the data driver 20. Although the display panel 50 does not display the image based on compensated video data, the presence of mura is less noticeable to the user in high-luminance images. By operating in low-power transmission driving mode for an extended period, the display device 1 may reduce power consumption.

In another aspect of the present disclosure, when video data is input from an external source, the display device 1 may divide the display panel 50 into a plurality of pixel row units and determine the average luminance for each divided area.

Figure 8:
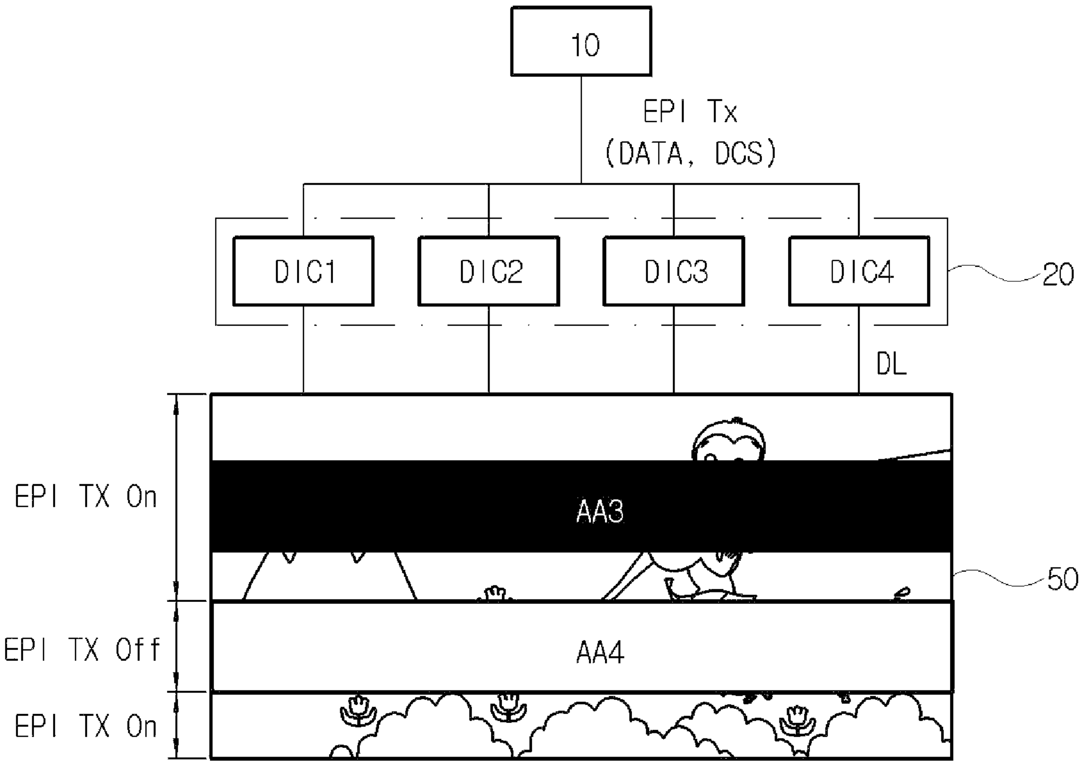

As shown in FIG. 8, a low-luminance image may be displayed in a third area AA3 while a high-luminance image may be displayed in the fourth area AA4. In this aspect, the display device 1 may decrease the low-power transmission driving threshold for the third area AA3 and increase the low-power transmission driving threshold for the fourth area AA4.

Consequently, even though the gradation difference between adjacent pixel rows in the third area AA3 is practically the same as in the fourth area AA4, the display device 1 may not perform low-power transmission driving for the third area (EPI Tx On), but it may perform low-power transmission driving for the fourth area (EPI Tx Off).

In another aspect, when video data is input from an external source, the display device 1 may divide the display panel 50 into areas connected to respective source drive circuits DICs and determine average luminance for each divided area.

Figure 9:
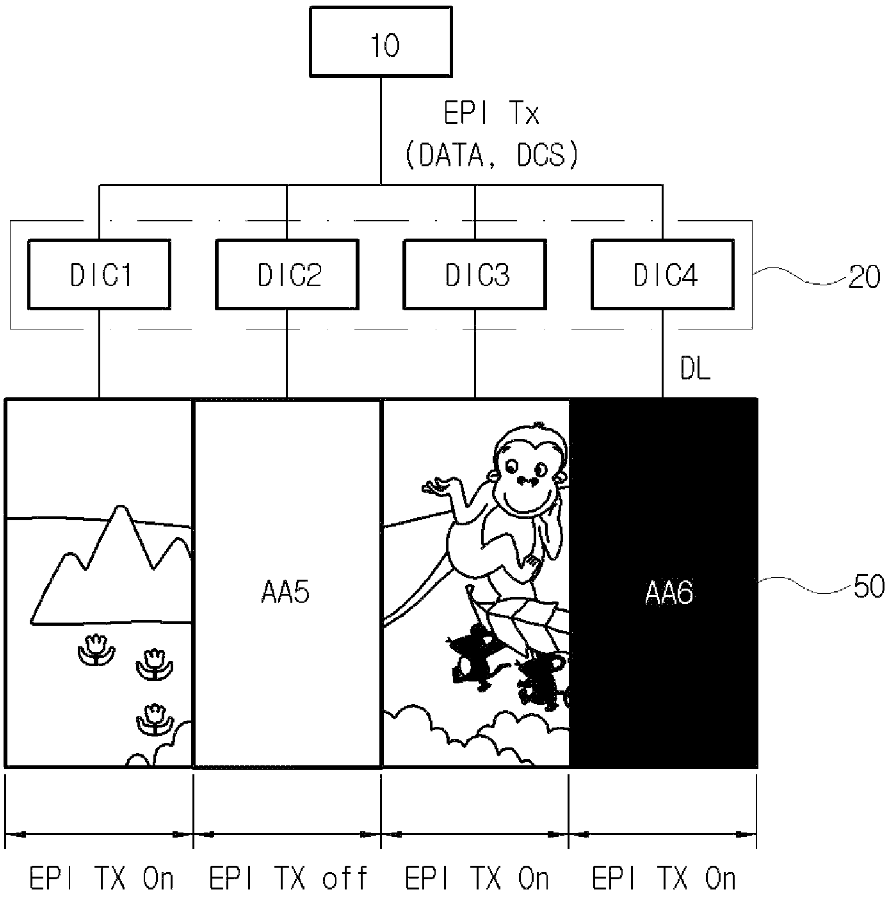

In an aspect, as shown in FIG. 9, the high-luminance image may be displayed in the fifth area AA5 connected to the second source drive circuit DIC2, and the low-luminance image may be displayed in the sixth area AA6 connected to the fourth source drive circuit DIC4. In this aspect, the display device 1 may increase the low-power transmission driving threshold for the fifth area AA5 and decrease the low-power transmission driving threshold for the sixth area AA6.

Consequently, even though there is the same gradation difference between adjacent pixel rows, the display device 1 may perform low-power transmission driving for the fifth area AA5 (EPI Tx Off) and may not perform low-power transmission driving for the sixth area (EPI Tx On). In particular, in this aspect, the timing controller 10 may turn off the EPI data transmission for the second source drive circuit DIC2 and turn on the EPI data transmission for the fourth source drive circuit DIC4, thereby independently controlling low-power transmission driving for each source drive circuit DIC1 to DIC4.

Thus, in this aspect, it is possible to determine whether to perform the low-power transmission driving for each area of the display panel 50. That is, the display device 1 may restrict low-power transmission driving for low-luminance images and tolerate low-power transmission driving for high-luminance images. Consequently, the display device 1 may reduce power consumption while improving mura and enhancing image quality.

The display devices and driving methods thereof according to the aspects are capable of reducing power consumption through low-power transmission driving mode.

The display devices and driving methods thereof according to the aspects are capable of preventing image artifacts and degradation in image quality caused by low-power transmission driving in display panels employing external compensation.

Although aspects of this disclosure have been described above with reference to the accompanying drawings, it will be understood that the technical configuration of this disclosure described above may be implemented in other specific forms by those skilled in the art without changing the technical concept or essential features of the present disclosure. Therefore, it should be understood that the aspects described above are exemplary and not limited in all respects. Furthermore, the scope of the present disclosure is defined by the claims set forth below, rather than the detailed description above. In addition, it should be understood that all modifications or variations derived from the meaning and scope of the claims and their equivalent concept are included within the scope of this disclosure.

What is claimed is:

1. A display device comprising:

a display panel comprising a plurality of pixels arranged thereon for displaying an image;

a data drive circuit comprising a plurality of source drive circuits each of which is connected to at least one pixel through a data line and supplies a data signal to the at least one pixel through the data line; and a timing control circuit connected to the plurality of source drive circuits through wires and configured to supply video data to the data drive circuit per frame through the wires according to predetermined interface protocol, wherein the timing control circuit operates in a low-power transmission driving mode or in a normal transmission driving mode, in the low-power transmission driving mode, the timing control circuit suspends transmission of the video data corresponding to the consecutive pixel rows for at least one corresponding source drive circuit among the plurality of source drive circuits in response to a gradation difference of the video data among consecutive pixel rows being equal to or less than a threshold value, and, in the normal transmission driving mode, the timing control circuit transmits the video data corresponding to the consecutive pixel rows for at least one corresponding source drive circuit among the plurality of the source drive circuits in response to the gradation difference of the video data among the consecutive pixel rows being greater than the threshold value, and wherein the threshold value varies with luminance of a corresponding frame.

2. The display device of claim 1, wherein the threshold value increases as the luminance of the corresponding frame increases.

3. The display device of claim 2, wherein the timing control circuit determines an average luminance of the video data and adjusts the threshold value to correspond to the average luminance.

4. The display device of claim 2, wherein the timing control circuit operates, based on the consecutive pixel rows varying identically in gradation, in the low-power transmission driving mode for an image area of a first luminance and in the normal transmission driving mode for an image area of a second luminance lower than the first luminance.

5. The display device of claim 2, wherein the timing control circuit divides the display panel into a plurality of areas and adjusts the threshold value independently based on the luminance of each of the plurality of areas.

6. The display device of claim 2, wherein the timing control circuit controls the low-power transmission driving mode independently for the plurality of source drive circuits.

7. The display device of claim 2, wherein the timing control circuit receives sensing data for the plurality of pixels from the plurality of source drive circuits and compensate for the video data based on the sensing data.

8. The display device of claim 7, wherein the timing control circuit transmits the compensated video data to the plurality of source drive circuits in the normal transmission driving mode and suspends the transmission of the compensated video data in the low-power transmission driving mode.

9. The display device of claim 8, wherein the timing control circuit transmits based on the consecutive pixel rows varying identically in gradation, the compensated video data according to an increased threshold value for an image area of a first luminance and suspends transmitting the compensated video data according to a decreased threshold value for an image area of a second luminance higher than the first luminance.

10. The display device of claim 2, wherein the threshold value is stored in a lookup table corresponding to each of a plurality of luminance ranges.

11. A method for driving a display device including a display panel including a plurality of pixels displaying an image, a plurality of source drive circuits supplying a data signal to the plurality of pixels, and a timing control circuit transmitting video data to the plurality of source drive circuits per frame, the method comprising:

determining, by the timing control circuit, luminance of the video data received from an external source;

adjusting a threshold value to correspond to the luminance of a corresponding frame;

operating, in response to a gradation difference of the video data between consecutive pixel rows being equal to or less than the threshold value, in a low-power transmission driving mode suspending transmission of the video data corresponding to the consecutive pixel rows for at least one corresponding source drive circuit among the plurality of source drive circuits; and operating, in response to the gradation difference of the video data between the consecutive pixel rows being greater than the threshold value, in a normal transmission driving mode transmitting the video data corresponding to the consecutive pixel rows for at least one corresponding source drive circuit among the plurality of source drive circuits.

12. The method of claim 11, wherein the threshold value increases as the luminance of the corresponding frame increases.

13. The method of claim 12, wherein the determining of the luminance of the video data comprises:

dividing the display panel into a plurality of areas by a pixel row; and determining the luminance for each of the plurality of areas.

14. The method of claim 13, wherein the adjusting of the threshold value comprises adjusting the threshold value independently for each of the plurality of areas.

15. The method of claim 12, wherein the determining of the luminance of the video data comprises determining the luminance for each of the plurality of areas respectively connected to the plurality of source drive circuits.

16. The method of claim 12, further comprising:

receiving sensing data for the plurality of pixels from the plurality of source drive circuits; and compensating the video data based on the sensing data.

17. The method of claim 16, further comprising:

transmitting the compensated video data for a first pixel row among two or more pixel rows; and suspending the transmission of the compensated video data for remaining pixel rows starting from a second pixel row among the two or more pixel rows.

18. A display device comprising:

a display panel comprising a plurality of pixels displaying an image;

a data drive circuit comprising a plurality of source drive integrated circuits (ICs) each of which is connected to at least one pixel through a data line and supplies a data signal to the at least one pixel through the data line; and a timing control circuit connected to the plurality of source drive ICs through wires and configured to differentially supply video data to the data drive circuit per frame based on a gradation difference in the video data among consecutive pixel rows, wherein the timing control circuit is configured to:

suspend transmission of the video data corresponding to the consecutive pixel rows for at least one corresponding source drive IC among the plurality of source drive ICs when the gradation difference in the video data among consecutive pixel rows is equal to or less than a threshold value; and transmit the video data corresponding to the consecutive pixel rows for at least one corresponding source drive IC among the source drive ICs when the gradation difference in the video data among the consecutive pixel rows is greater than the threshold value.

19. The display device of claim 18, wherein the threshold value increases as luminance of a corresponding frame increases.

* * * * *